(12) United States Patent
Tang (10) Patent No.: US 11,013,058 B2
(45) Date of Patent: May 18, 2021

(54) COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 21 days.

(21) Appl. No.: 16/618,895

(22) PCT Filed: Aug. 25, 2017

(86) PCT No.: PCT/CN2017/099164
§ 371 (c)(1),
(2) Date: Dec. 3, 2019

(87) PCT Pub. No.: WO2019/037127
PCT Pub. Date: Feb. 28, 2019

(65) Prior Publication Data
US 2020/0092938 A1    Mar. 19, 2020

(51) Int. Cl.
*H04W 76/28* (2018.01)
*H04W 52/02* (2009.01)
*H04W 56/00* (2009.01)

(52) U.S. Cl.
CPC ....... *H04W 76/28* (2018.02); *H04W 52/0216* (2013.01); *H04W 52/0229* (2013.01); *H04W 56/005* (2013.01)

(58) Field of Classification Search
CPC ............. H04W 76/28; H04W 52/0216; H04W 52/0229; H04W 56/005; H04W 52/02; Y02D 30/70
See application file for complete search history.

(56) References Cited

U.S. PATENT DOCUMENTS

2008/0181127 A1\* 7/2008 Terry .................. H04W 76/28
370/252
2008/0267105 A1 10/2008 Wang et al.
(Continued)

FOREIGN PATENT DOCUMENTS

CN   101534544   9/2009
RU    2420030    5/2011
(Continued)

OTHER PUBLICATIONS

Huawei et al., "On 'wake-up signal' for eFeMTC," 3GPP TSG RAN WG1 Meeting #89, R1-1707018, May 2017, 7 pages.
(Continued)

*Primary Examiner* — Eunsook Choi
(74) *Attorney, Agent, or Firm* — Hodgson Russ LLP (57) ABSTRACT

Provided in embodiments of the present application are a wireless communication method and device. The method includes: determining, by a network device, a type of a discontinuous transmission (DRX) indication signal according to DRX configuration information, wherein the DRX indication signal is configured to indicate that a terminal device wakes up during an on duration of a DRX cycle; and according to the determined type of the DRX indication signal, sending by the network device the DRX indication signal to the terminal device.

20 Claims, 3 Drawing Sheets

(56) References Cited

U.S. PATENT DOCUMENTS

| | | | | |
|---|---|---|---|---|
| 2013/0170415 | A1* | 7/2013 | Fukuta | H04W 52/0209 |
| | | | | 370/311 |
| 2015/0109979 | A1* | 4/2015 | Miklos | H04W 76/28 |
| | | | | 370/311 |
| 2015/0334637 | A1* | 11/2015 | Kim | H04W 52/365 |
| | | | | 370/312 |
| 2016/0057806 | A1* | 2/2016 | Wittberg | H04W 76/28 |
| | | | | 370/336 |
| 2016/0081022 | A1* | 3/2016 | Haneji | H04W 76/28 |
| | | | | 370/311 |
| 2016/0119970 | A1* | 4/2016 | Lee | H04L 41/0813 |
| | | | | 370/328 |
| 2016/0192339 | A1* | 6/2016 | Axmon | H04W 24/10 |
| | | | | 370/329 |
| 2016/0366721 | A1* | 12/2016 | Song | H04L 12/189 |
| 2020/0145921 | A1* | 5/2020 | Zhang | H04W 76/27 |

FOREIGN PATENT DOCUMENTS

| | | |
|---|---|---|
| RU | 2453993 | 6/2012 |
| RU | 2578166 | 3/2016 |
| WO | 2017100090 | 6/2017 |

OTHER PUBLICATIONS

Ericsson, "Downlink channel power efficiency for MTC," 3GPP TSG-RAN WG1 #89, R1-1706882, May 2017, 5 pages.

EPO, Office Action for EP Application No. 17922823.4, dated Jun. 29, 2020.

CIPO, Office Action for CA Application No. 3,064,965, dated Feb. 16, 2021.

FIPS, Office Action for RU Application No. 2019142471, dated Nov. 26, 2020.

Qualcomm Incorporated, "Efficient monitoring of DL control channels," 3GPP TSG RAN WG1 Meeting #90, R1-1712800, Aug. 2017, 10 pages.

Sony, "Power consumption evaluation of wake-up signal technique for feNBIoT," 3GPP TSG RAN WG1 Meeting #89, R1-1708247, May 2017, 7 pages.

WIPO, ISR for PCT/CN2017/099164, dated May 16, 2018.

KIPO, Office Action for KR Application No. 10-2020-7004571, dated Mar. 2, 2021.

* cited by examiner

COMMUNICATION METHOD, TERMINAL DEVICE AND NETWORK DEVICE

CROSS-REFERENCE TO RELATED APPLICATION

This application is a U.S. national phase application of International Application No. PCT/CN2017/099164, filed Aug. 25, 2017, the entire disclosure of which is incorporated herein by reference.

TECHNICAL FIELD

Embodiments of the present disclosure generally relate to communication technologies, and more particularly, to communication methods, terminal devices and network devices.

BACKGROUND

For the purpose of saving power for terminals, a discontinuous transmission (DRX) mechanism is introduced in a Long Term Evolution (LTE) system. When there is no data transmission, the power consumption can be reduced by stopping receiving the Physical Downlink Control Channel (PDCCH), thereby improving battery life. The basic mechanism of DRX is to configure a DRX cycle for a terminal in a Radio Resource Control (RRC) connected state (RRC_CONNECTED). The DRX cycle consists of an On Duration and an Opportunity for DRX. During the On Duration, the terminal monitors and receives the PDCCH; during the Opportunity for DRX, the user equipment (UE) does not receive the PDCCH to reduce power consumption.

In future communication systems, there is a high requirement for communication performance.

Therefore, how to improve DRX to improve communication performance is an urgent problem to be solved.

SUMMARY

Embodiments of the present disclosure provides wireless communication methods and devices to make sending of a DRX indication signal can better match DRX configuration information and thereby to improve communication performance.

According to a first aspect, there is provided a communication method, including:

determining, by a network device, a type of a discontinuous transmission (DRX) indication signal according to DRX configuration information, wherein the DRX indication signal is configured to indicate that a terminal device wakes up during an on duration of a DRX cycle; and according to the determined type of the DRX indication signal, sending by the network device the DRX indication signal to the terminal device.

In embodiments of the present disclosure, the network device can determine the type of the DRX indication signal according to the DRX configuration information, so that the DRX indication signal which is more in line with the DRX configuration can be selected, thereby improving the communication performance.

It should be understood that the terminologies mentioned in the embodiments of the present disclosure should not specifically limit the scope of the embodiments of the present disclosure.

For example, the on duration mentioned in the embodiments of the present disclosure may also have another names (for example, a wake-up period). The on duration (or activation period) mentioned in the embodiments of the present disclosure refers to a period in which the terminal device performs the detection of the PDCCH and/or the receipt of other information.

In connection with the first aspect, in a possible implementation of the first aspect, at least one of a sequence type, a sequence number, and a sequence length for different types of DRX indication signals is different.

In connection with the first aspect or any possible implementation mentioned above, in another possible implementation of the first aspect, different types of DRX indication signals provide different synchronization capabilities.

In connection with the first aspect or any possible implementation mentioned above, in another possible implementation of the first aspect, the determined type of the DRX indication signal is a first type or a second type;

a DRX indication signal of the first type provides a synchronization capability; and a DRX indication signal of the second type does not provide the synchronization capability.

Thus, the terminal device can determine whether the DRX indication signal provides the synchronization capability according to the DRX configuration information. In this way, embodiments of the present disclosure can avoid taking up too many resources and avoid performing the synchronization based on PSS/SSS.

In exemplary embodiments of the present disclosure, in addition to distinguishing the DRX indication signals into two types of DRX indication signals, i.e., a DRX indication signal that provides a synchronization capability and a DRX indication signal that does not provide the synchronization capability, the types of the DRX indication signals can be divided according to the synchronization capability. For example, the DRX indication signals capable of providing the synchronization capability may be divided into at least two types depending on whether the synchronization capability is great or small.

In connection with the first aspect or any possible implementation mentioned above, in another possible implementation of the first aspect, the DRX configuration information includes a length of the DRX cycle.

In connection with the first aspect or any possible implementation mentioned above, in another possible implementation of the first aspect, determining, by a network device, a type of a DRX indication signal according to DRX configuration information, includes:

if the length of the DRX cycle is greater than a first duration, determining that the type of the DRX indication signal is a first type that provides a synchronization capability; or if the length of the DRX cycle is smaller than or equal to the first duration, determining that the type of the DRX indication signal is a second type that does not provide the synchronization capability.

In connection with the first aspect or any possible implementation mentioned above, in another possible implementation of the first aspect, the first duration is a preset duration on the network device.

In connection with the first aspect or any possible implementation mentioned above, in another possible implementation of the first aspect, determining, by a network device, a type of a DRX indication signal according to DRX configuration information, includes:

determining, by the network device, the type of the DRX indication signal according to the DRX configuration information and the capability information of the terminal device.

In connection with the first aspect or any possible implementation mentioned above, in another possible implementation of the first aspect, the capability information of the terminal device includes a duration in which the terminal maintains time-frequency synchronization; and/or, the DRX configuration information includes a length of the DRX cycle.

In connection with the first aspect or any possible implementation mentioned above, in another possible implementation of the first aspect, determining, by the network device, the type of the DRX indication signal according to the DRX configuration information and the capability information of the terminal device, includes:

determining a second duration according to the duration in which the terminal maintains time-frequency synchronization;

if the length of the DRX cycle is greater than the second duration, determining that the type of the DRX indication signal is a first type that provides a synchronization capability; or if the length of the DRX cycle is smaller than or equal to the second duration, determining that the type of the DRX indication signal is a second type that does not provide the synchronization capability.

In connection with the first aspect or any possible implementation mentioned above, in another possible implementation of the first aspect, the method further includes:

notifying, by the network device, the terminal device of the second duration.

In connection with the first aspect or any possible implementation mentioned above, in another possible implementation of the first aspect, determining, by the network device, the type of the DRX indication signal according to the DRX configuration information and the capability information of the terminal device, includes:

if the length of the DRX cycle is greater than a duration in which the terminal maintains time-frequency synchronization, determining that the type of the DRX indication signal is a first type that provides a synchronization capability; or if the length of the DRX cycle is smaller than or equal to the duration in which the terminal maintains time-frequency synchronization, determining that the type of the DRX indication signal is a second type that does not provide the capability.

In embodiments of the present disclosure, if the length of the DRX cycle is short, it may be a short time since the last possible wake-up time of the terminal device, the terminal device is more likely to synchronize with the network device, and the type of the DRX indication signal sent to the terminal device may be a DRX indication signal that cannot provide the synchronization capability. If the length of the DRX cycle is long, it may be a long time since the last possible wake-up time of the terminal device, the possibility for the terminal device and the network device to keep synchronization is small, and the type of the DRX indication signal transmitted to the terminal device may be a DRX indication signal that provides the synchronization capability In connection with the first aspect or any possible implementation mentioned above, in another possible implementation of the first aspect, the method further includes:

receiving, by the network device, indication information sent from the terminal device, wherein the indication information is configured to indicate capability information of the terminal device.

In connection with the first aspect or any possible implementation mentioned above, in another possible implementation of the first aspect, sending by the network device the DRX indication signal to the terminal device, includes:

sending the DRX indication signal to the terminal device before the on duration or in a first subframe or a first time slot within the on duration.

According to a second aspect, there is provided a communication method, including:

determining, by a terminal device, a type of a discontinuous transmission (DRX) indication signal according to DRX configuration information, wherein the DRX indication signal is configured to indicate that the terminal device wakes up during an on duration of a DRX cycle;

according to the type of the DRX indication signal, detecting by the terminal device the DRX indication signal sent from a network device; and in response to the DRX indication signal, the terminal device waking up in the on duration of the DRX cycle.

In connection with the second aspect, in a possible implementation of the second aspect, at least one of a sequence type, a sequence number, and a sequence length for different types of DRX indication signals is different.

In connection with the second aspect or any possible implementation mentioned above, in another possible implementation of the second aspect, different types of DRX indication signals provide different synchronization capabilities.

In connection with the second aspect or any possible implementation mentioned above, in another possible implementation of the second aspect, the determined type of the DRX indication signal is a first type or a second type;

a DRX indication signal of the first type provides a synchronization capability; and a DRX indication signal of the second type does not provide the synchronization capability.

In connection with the second aspect or any possible implementation mentioned above, in another possible implementation of the second aspect, if the determined type of the DRX indication signal is the first type, the method further includes:

during detection of the DRX indication signal, performing a synchronization procedure by the terminal device based on the detected DRX indication signal.

In connection with the second aspect or any possible implementation mentioned above, in another possible implementation of the second aspect, detecting by the terminal device the DRX indication signal sent from a network device according to the type of the DRX indication signal, includes:

according to a sequence length and/or a sequence number corresponding to the type of the DRX indication signal, detecting by the terminal device the DRX indication signal sent from the network device.

In connection with the second aspect or any possible implementation mentioned above, in another possible implementation of the second aspect, the DRX configuration information includes a length of the DRX cycle.

In connection with the second aspect or any possible implementation mentioned above, in another possible implementation of the second aspect, determining, by a terminal device, a type of a DRX indication signal according to DRX configuration information, includes:

if the length of the DRX cycle is greater than a first duration, determining that the type of the DRX indication signal is a first type that provides a synchronization capability; or if the length of the DRX cycle is smaller than or equal to the first duration, determining that the type of the DRX indication signal is a second type that does not provide the synchronization capability.

In connection with the second aspect or any possible implementation mentioned above, in another possible implementation of the second aspect, the first duration is a preset duration on the terminal device.

In connection with the second aspect or any possible implementation mentioned above, in another possible implementation of the second aspect, determining, by a terminal device, a type of a DRX indication signal according to DRX configuration information, includes:

if the length of the DRX cycle is greater than a second duration notified by the network device, determining that the type of the DRX indication signal is a first type that provides a synchronization capability; or if the length of the DRX cycle is smaller than or equal to a second duration notified by the network device, determining that the type of the DRX indication signal is a second type that does not provide the synchronization capability;

wherein the second duration is determined by the network device based on capability information of the terminal device.

In connection with the second aspect or any possible implementation mentioned above, in another possible implementation of the second aspect, determining, by a terminal device, a type of a DRX indication signal according to DRX configuration information, includes:

determining, by the terminal device, the type of the DRX indication signal according to the DRX configuration information and capability information of the terminal device.

In connection with the second aspect or any possible implementation mentioned above, in another possible implementation of the second aspect, the capability information of the terminal device includes a duration in which the terminal maintains time-frequency synchronization; and/or, the DRX configuration information includes a length of the DRX cycle.

In connection with the second aspect or any possible implementation mentioned above, in another possible implementation of the second aspect, determining, by the terminal device, the type of the DRX indication signal according to the DRX configuration information and capability information of the terminal device, includes:

determining a second duration according to the duration in which the terminal maintains time-frequency synchronization;

if the length of the DRX cycle is greater than the second duration, determining that the type of the DRX indication signal is a first type that provides a synchronization capability; or if the length of the DRX cycle is smaller than or equal to the second duration, determining that the type of the DRX indication signal is a second type that does not provide the synchronization capability.

In connection with the second aspect or any possible implementation mentioned above, in another possible implementation of the second aspect, determining, by the terminal device, the type of the DRX indication signal according to the DRX configuration information and capability information of the terminal device, includes:

if the length of the DRX cycle is greater than the duration in which the terminal maintains time-frequency synchronization, determining that the type of the DRX indication signal is a first type that provides a synchronization capability; or if the length of the DRX cycle is smaller than or equal to the duration in which the terminal maintains time-frequency synchronization, determining that the type of the DRX indication signal is a second type that does not provide the capability.

In connection with the second aspect or any possible implementation mentioned above, in another possible implementation of the second aspect, the method further includes:

sending, by the terminal device, indication information to the network device, wherein the indication information is configured to indicate capability information of the terminal device.

In connection with the second aspect or any possible implementation mentioned above, in another possible implementation of the second aspect, wherein detecting by the terminal device the DRX indication signal sent from a network device, includes:

detecting, by the terminal device, the DRX indication signal sent from the network device before the on duration or in a first subframe or a first time slot within the on duration.

According to a third aspect, there is provided a network device. The network device is configured to performing the methods according to the first aspect or any of the possible implementations in the first aspect. In particular, the network device includes units for performing the methods according to the first aspect or any of the possible implementations in the first aspect.

According to a fourth aspect, there is provided a terminal device. The terminal device is configured to performing the methods according to the second aspect or any of the possible implementations in the second aspect. In particular, the terminal device includes units for performing the methods according to the second aspect or any of the possible implementations in the second aspect.

According to a fifth aspect, there is provided a network device. The network device includes a memory, a processor, an input interface, and an output interface. The memory, the processor, the input interface, and the output interface are connected by a bus system. The memory is configured to store instructions, and the processor is configured to execute the instructions stored in the memory to perform the methods according to the first aspect or any of the possible implementations in the first aspect.

According to a sixth aspect, there is provided a terminal device. The terminal device includes a memory, a processor, an input interface, and an output interface. The memory, the processor, the input interface, and the output interface are connected by a bus system. The memory is configured to store instructions, and the processor is configured to execute the instructions stored in the memory to perform the methods according to the second aspect or any of the possible implementations in the second aspect.

According to a seventh aspect, there is provided a computer storage medium. The computer storage medium is configured to store computer software instructions for performing the methods according to the first aspect or any of the possible implementations in any of the aspects or any of the possible implementations. The computer software instructions include programs for performing the above designs.

According to an eighth aspect, there is provided a computer program product including computer software instructions for performing the methods according to any one of the aspects or any of the possible implementations. The computer software instructions are stored in a computer storage medium.

BRIEF DESCRIPTION OF THE DRAWINGS

In order to more clearly illustrate the technical solutions of the embodiments of the present disclosure, the drawings to be used in the embodiments or the prior arts will be briefly described below. Obviously, the drawings in the following description are only some examples of the present disclosure, and those skilled in the art can obtain other drawings according to the drawings without any creative work.

DETAILED DESCRIPTION

The technical solutions in the embodiments of the present disclosure are described in conjunction with the accompanying drawings. It is obvious that the described embodiments are a part of the embodiments of the present disclosure, and not all of the embodiments. All other embodiments obtained by a person of ordinary skill in the art based on the embodiments of the present disclosure without departing from the inventive scope fall with the scope of the present disclosure.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a LTE system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a New Radio (NR) or a future 5G systems, and so on.

Figure 1:
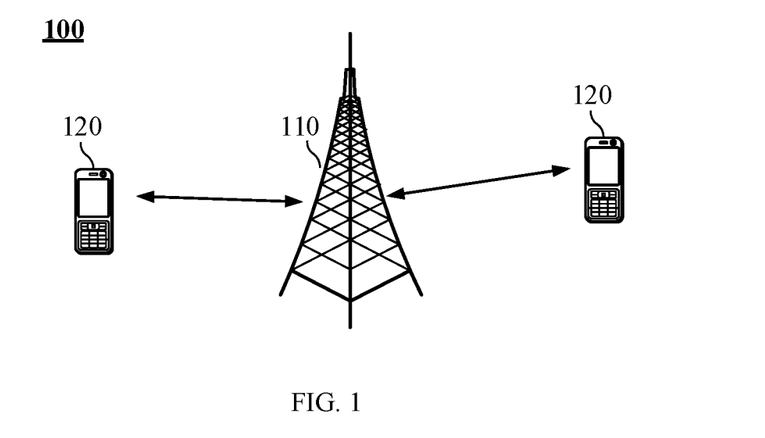
FIG. 1 is a schematic diagram of a wireless communication system according to an embodiment of the present disclosure.

FIG. 1 shows a wireless communication system 100 involved in embodiments of the present disclosure.

FIG. 1 exemplarily shows one network device and two terminal devices. Alternatively, the wireless communication system 100 may include a plurality of network devices and may include other numbers of terminal devices within the coverage of each network device, and embodiments of the present disclosure do not impose specific limitations on this The wireless communication system 100 may include a network device 110. The network device 110 may be a device for communicating with a terminal device. The network device 110 can provide communication coverage for a particular geographic area and can communicate with terminal devices (e.g., UEs) located within the coverage area. For example, the network device 110 may be a Base Transceiver Station (BTS) in GSM or CDMA system, or may be a base station (NodeB, NB) in a WCDMA system, or may be an evolutional base station (eNB or eNodeB) in the LTE system, or may be a wireless controller in a cloud radio access network (CRAN) scenario, or the network device may be a relay station, a access point, an in-vehicle device, a wearable device, and a network device in the future 5G network or a network device in the future evolutional Public Land Mobile Network (PLMN), and the like.

The wireless communication system 100 also includes at least one terminal device 120 within the coverage area of the network device 110. The terminal device 120 may be mobile or fixed. For example, the terminal device 120 may refer to an access terminal, a user equipment (UE), a subscriber unit, a subscriber station, a mobile station, a mobile terminal, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handled device with wireless communication functions, computing devices or other processing devices connected to wireless modems, in-vehicle devices, wearable devices, terminal devices in future 5G networks, or terminal devices in the future evolutional Public Land Mobile Network (PLMN), and the like.

According to exemplary embodiments, device to device (D2D) communication can be performed between the terminal devices 120.

Alternatively, the 5G system or network may also be referred to as a New Radio (NR) system or network.

According to exemplary embodiments, the wireless communication system 100 may further include other network entities, such as a network controller, a mobility management entity, and the like. Embodiments of the present disclosure do not impose specific limitations on this.

Figure 2:
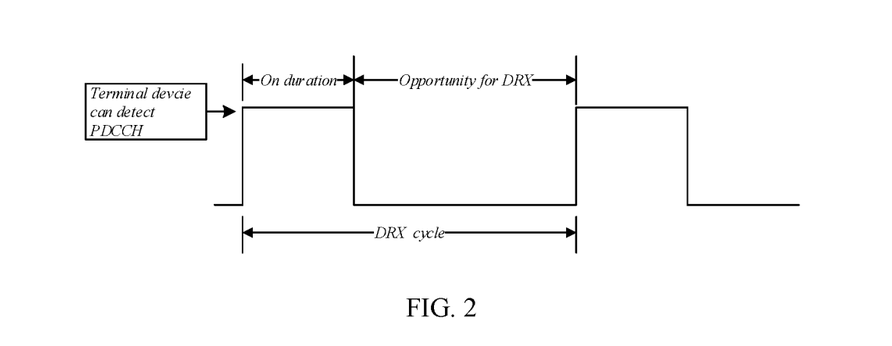
FIG. 2 is a schematic diagram of a DRX cycle according to an embodiment of the present disclosure.

According to embodiments of the present disclosure, as shown in FIG. 2, a DRX cycle is composed of an On Duration and an Opportunity for DRX. During the On Duration, the UE monitors and receives the PDCCH; during the Opportunity for DRX, the terminal does not receive the PDCCH to reduce power consumption (sleep period).

The transmission of the paging message may also be a DRX mechanism in an RRC idle state, and the DRX cycle is the cycle of the paging message under such condition.

However, although the network device configures the DRX mechanism for the terminal device, the terminal device is only opportunistically scheduled in the on duration which appears periodically, and when the terminal service load is low, the terminal is scheduled in only a few DRX cycles. For paging messages using the DRX mechanism, there are less occasions for the terminal to receive the paging message. Therefore, after the DRX mechanism is configured for the terminal, the PDCCH detection in most on durations does not detect the data scheduling, and there is further optimization space.

In order to solve the problem, if the network device determines that the terminal device needs to be scheduled in the DRX on duration, the DRX indication signal, such as the wake-up signal, is sent to the terminal device before the DRX cycle to wake up the terminal device; otherwise, the DRX is not sent to the terminal. The terminal device wakes up only after the wake-up signal is detected, and performs PDCCH detection and data reception in the DRX on duration; otherwise, the PDCCH detection is not performed.

Figure 3:
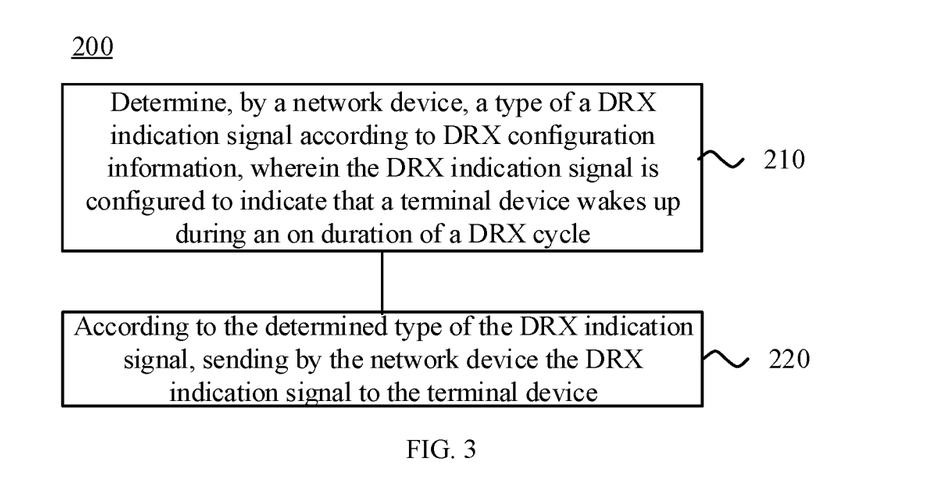
FIG. 3 is a schematic flowchart of a communication method according to an embodiment of the present disclosure.

In order to improve the communication performance, the embodiments of the present disclosure provide a communication method 200 in terms of the DRX indication signal. As shown in FIG. 3, the method 200 includes at least some of the following.

In 210, the network device determines a type of a DRX indication signal according to DRX configuration information. The DRX indication signal is configured to indicate that a terminal device wakes up during an on duration of a DRX cycle.

According to exemplary embodiments, the network device may perform DRX configuration on the network device in a broadcast, unicast, or multicast manner. The DRX configuration information on which the type of the DRX indication signal is determined may be DRX configuration information configured by the network device for the terminal device that receives the DRX indication signal.

According to exemplary embodiments, for terminal devices having different configurations, the types of the sent DRX indication signals may be different.

In 220, the network device sends the DRX indication signal to the terminal device according to the determined type of the DRX indication signal.

According to exemplary embodiments, before the on duration, or in the first subframe or the first time slot within the on duration, the network device sends the DRX indication signal to the terminal device.

In the embodiments of the present disclosure, the network device may determine the type of the DRX indication signal based on the DRX configuration information, and may select the DRX indication signal which is more in line with the DRX configuration, so that the communication performance may be improved.

It should be understood that the terminologies mentioned in the embodiments of the present disclosure should not specifically limit the scope of the embodiments of the present disclosure.

For example, the on duration mentioned in the embodiments of the present disclosure may also have another names (for example, a wake-up period). The on duration (or activation period) mentioned in the embodiments of the present disclosure refers to a period in which the terminal device performs the detection of the PDCCH and/or the receipt of other information.

It should also be understood that the DRX mechanism of the embodiments of the present disclosure can be applied to other mechanisms than those shown in FIG. 2.

For example, if the terminal device does not wake up in a certain on duration as shown in FIG. 2, the on duration may still be referred to as a sleep period or the like.

Of course, the on duration mentioned in the embodiments of the present disclosure may also be a time period in which the terminal device has a possibility of being scheduled, and the time period occurs periodically.

According to exemplary embodiments, at least one of a sequence type, a sequence number, and a sequence length for different types of DRX indication signals is different.

According to exemplary embodiments, different types of DRX indication signals provide different synchronization capabilities.

According to exemplary embodiments, the determined type of the DRX indication signal is a first type or a second type;

a DRX indication signal of the first type provides a synchronization capability; and a DRX indication signal of the second type does not provide the synchronization capability.

Specifically, since the cycle of DRX may be long, for example, the DRX cycle may be up to 2560 ms or 45 minutes. If the terminal device is configured with a long DRX cycle, the terminal device needs to re-obtain downlink synchronization when receiving and detecting the DRX indication signal before the DRX wake-up.

The terminal device can obtain downlink synchronization based on the following two methods:

1) The terminal device obtains downlink synchronization based on a Primary Synchronization Signal (PSS)/Secondary Synchronization Signal (SSS).

2) The terminal device obtains downlink synchronization based on the DRX indication signal itself, that is, the DRX indication signal itself provides the synchronization capability.

In the first method, the design of the DRX indication signal is relatively simple, because there is no need to assist the terminal device to complete downlink synchronization, and the used resources are relatively small. But, the terminal device needs to receive the time-discrete PSS/SSS signals to obtain synchronization, and then detect the DRX indication signal.

In the second method, the power consumption of the terminal device is more saved. Because the DRX indication signal itself can provide the synchronization capability, the time for the terminal device to detect the DRX indication signal is relatively tight, and the terminal device can complete synchronization and detect the DRX indication signal in a short time.

Therefore, the terminal device can determine whether the DRX indication signal provides the synchronization capability based on the DRX configuration information. In this way, embodiments of the present disclosure can avoid taking up too many resources and avoid performing the synchronization based on PSS/SSS.

According to embodiments of the present disclosure, that the DRX indication signal provides a synchronization capability may refer to that the DRX indication signal carries a synchronization signal sequence, and that the DRX indication signal does not provide the synchronization capability refers to that the DRX indication signal does not carry the synchronization signal sequence.

According to embodiments of the present disclosure, that the DRX indication signal provides the synchronization capability refers to that the sequence itself included in the DRX indication signal can provide the synchronization capability, and that the DRX indication signal does not provide the synchronization capability refers to that the sequence itself included in the DRX indication signal does not provide the synchronization capability.

In exemplary embodiments of the present disclosure, in addition to distinguishing the DRX indication signals into two types of DRX indication signals, i.e., a DRX indication signal that provides a synchronization capability and a DRX indication signal that does not provide the synchronization capability, the types of the DRX indication signals can be divided according to the synchronization capability. For example, the DRX indication signals capable of providing the synchronization capability may be divided into at least two types depending on whether the synchronization capability is great or small.

For example, DRX indication signals that provide the synchronization capability can be divided into a DRX indication signal that provides coarse synchronization and a DRX indication signal that provides fine synchronization.

For example, DRX indication signals that provide the synchronization capability can be divided into a DRX indication signal that provides coarse synchronization, a DRX indication signal that provides fine synchronization, and a DRX indication signal that provides finer synchronization.

According to embodiments of the present disclosure, the stronger the synchronization capability provided by a DRX indication signal is, the larger the number of the sequences included in the DRX indication signal will be, and/or the longer the sequence(s) included in the DRX indication signal will be.

For example, in embodiments of the present disclosure, a DRX indication signal that does not provide the synchronization capability includes a longer sequence than a DRX indication signal that provides the synchronization capability.

For example, in embodiments of the present disclosure, a DRX indication signal that provides fine synchronization includes a longer sequence than a DRX indication signal that provides coarse synchronization.

For example, in embodiments of the present disclosure, a DRX indication signal that does not provide the synchronization capability includes fewer sequences than a DRX indication signal that provides the synchronization capability.

For example, in embodiments of the present disclosure, a DRX indication signal that provides fine synchronization includes a larger number of sequences than a DRX indication signal that provides coarse synchronization.

According to an exemplary embodiment, the network device may determine the type of the DRX indication signal based on the length of the DRX cycle included in the DRX configuration information.

It should be understood that the embodiments of the present disclosure are not limited to determining the type of the DRX indication signal according to the length of the DRX cycle, and may determine the type of the DRX indication signal based on other DRX configuration information. For example, the type of the DRX indication signal may be determined according to the length of the on duration in the DRX cycle, or the length of the sleep period in the DRX cycle, and the like.

According to embodiments of the present disclosure, if the length of the DRX cycle is greater than a first duration, it is determined that the type of the DRX indication signal is a first type that provides a synchronization capability.

According to embodiments of the present disclosure, if the length of the DRX cycle is smaller than or equal to the first duration, determining that the type of the DRX indication signal is a second type that does not provide the synchronization capability.

According to embodiments of the present disclosure, the first duration is a preset duration on the network device.

Specifically, if the DRX cycle is greater than a threshold T, the network device sends a DRX indication signal of the first type to the terminal device; otherwise, the network device sends a DRX indication signal of the second type to the terminal device.

For example, the cycle threshold is set to T=600 ms. If the DRX cycle is greater than 600 ms, the DRX indication signal sent to the terminal can provide the synchronization capability; otherwise, the DRX indication signal sent to the terminal device does not provide the synchronization capability.

According to embodiments of the present disclosure, the network device determines the type of the DRX indication signal based on the DRX configuration information and the capability information of the terminal device.

According to embodiments of the present disclosure, the capability information of the terminal device includes a duration in which the terminal device maintains time-frequency synchronization.

In order to understand the present disclosure more clearly, two implementations will be described below to explain how to determine the type of the DRX indication signal based on the DRX configuration information and the capability information of the terminal device.

In an implementation, a second duration is determined according to the duration in which the terminal maintains time-frequency synchronization; if the length of the DRX cycle is greater than the second duration, it is determined that the type of the DRX indication signal is a first type that provides a synchronization capability; or if the length of the DRX cycle is smaller than or equal to the second duration, it is determined that the type of the DRX indication signal is a second type that does not provide the synchronization capability.

According to embodiments of the present disclosure, the network device notifies the terminal device of the second duration.

For example, if the terminal device reports the duration information in which the terminal device maintains the time-frequency synchronization as T_UE=1200 ms, the second duration may be determined based on the duration information, for example, the second duration may be 1000 ms. If the DRX cycle is greater than 1000 ms, the DRX indication signal sent to the terminal device can provide the synchronization capability; otherwise, the DRX indication signal sent to the terminal device does not provide the synchronization capability.

The second duration determined by the network device according to the duration in which the terminal device maintains the time-frequency synchronization may be equal to the duration in which the terminal device maintains the time-frequency synchronization.

Alternatively, the second duration determined by the network device according to the duration in which the terminal device maintains the time-frequency synchronization may be shorter than the duration in which the terminal device maintains the time-frequency synchronization.

In an implementation, if the length of the DRX cycle is greater than the duration in which the terminal device maintains the time-frequency synchronization, it is determined that the type of the DRX indication signal is a first type that provides the synchronization capability; or, if the length of the DRX cycle is smaller than or equal to the duration in which the terminal device maintains the time-frequency synchronization, it is determined that the type of the DRX indication signal is a second type that does not provide the synchronization capability.

For example, the terminal device reports the duration information in which the terminal device maintains the time-frequency synchronization as T_UE=1200 ms. If the DRX cycle is greater than 1200 ms, the DRX indication signal sent to the terminal device can provide the synchronization capability; otherwise, the DRX indication signal sent to the terminal device does not provide the synchronization capability.

Specifically, in embodiments of the present disclosure, if the length of the DRX cycle is short, it may be a short time since the last possible wake-up time of the terminal device, the terminal device is more likely to keep synchronization with the network device, and the type of the DRX indication signal sent to the terminal device may be a DRX indication signal that does not provide the synchronization capability.

If the length of the DRX cycle is long, it may be a long time since the last possible wake-up time of the terminal device, the possibility for the terminal device and the network device to keep synchronization is small, and the type of the DRX indication signal transmitted to the terminal device may be a DRX indication signal that provides the synchronization capability.

If the duration in which the terminal device maintains time-frequency synchronization is short, it is more likely that the terminal device and the network device can keep synchronization, and the type of the DRX indication signal transmitted to the terminal device may be a DRX indication signal that does not provide the synchronization capability. If the duration in which the terminal device maintains time-frequency synchronization is long, the possibility that the terminal device and the network device can keep synchronization is small, and the type of the DRX indication signal transmitted to the terminal device may be a DRX indication signal that provides the synchronization capability.

According to embodiments of the present disclosure, the network device receives indication information sent from the terminal device, and the indication information is used to indicate capability information of the terminal device.

In the embodiments of the present disclosure, the transmission of the DRX indication signal can be further optimized by considering the length of the DRX cycle and the duration information in which the terminal device maintains the time-frequency synchronization.

Figure 4:
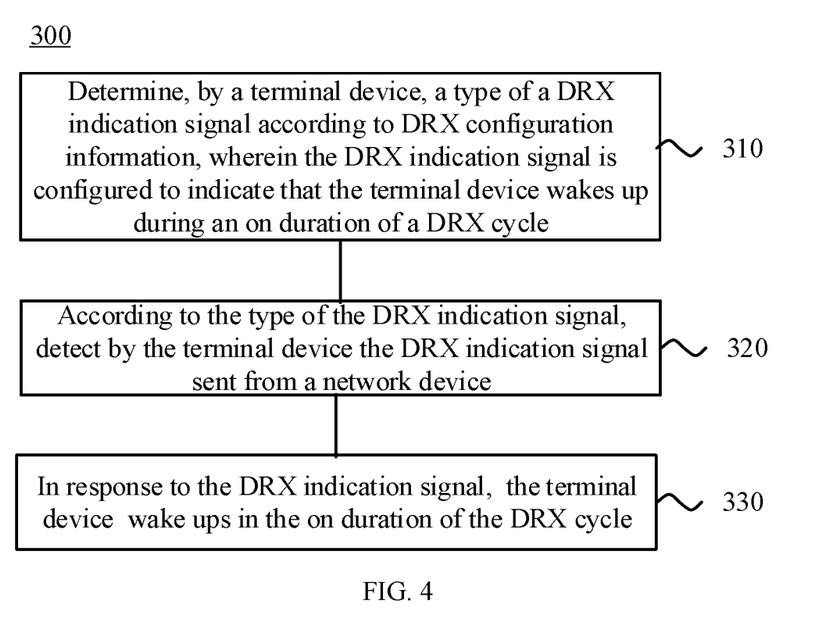
FIG. 4 is a schematic flowchart of a communication method according to an embodiment of the present disclosure.

FIG. 4 is a schematic flowchart of a communication method 300 according to an embodiment of the present disclosure.

In 310, a terminal device determines a type of a DRX indication signal according to DRX configuration information. The DRX indication signal is configured to indicate that the terminal device wakes up during an on duration of a DRX cycle.

The terminal device detects the DRX indication signal sent from a network device before the on duration, or in a first subframe or a first time slot within the on duration.

In 320, according to the type of the DRX indication signal, the terminal device detects the DRX indication signal sent from a network device.

In 330, in response to the DRX indication signal, the terminal device wakes up in the on duration of the DRX cycle.

According to exemplary embodiments of the present disclosure, at least one of a sequence type, a sequence number (or the amount of sequences), and a sequence length for different types of DRX indication signals is different.

According to exemplary embodiments of the present disclosure, different types of DRX indication signals provide different synchronization capabilities.

According to exemplary embodiments of the present disclosure, the determined type of the DRX indication signal is a first type or a second type; a DRX indication signal of the first type provides a synchronization capability; and a DRX indication signal of the second type does not provide the synchronization capability.

According to exemplary embodiments of the present disclosure, if the determined type of the DRX indication signal is the first type, during detection of the DRX indication signal, the terminal device performs a synchronization procedure based on the detected DRX indication signal.

According to exemplary embodiments of the present disclosure, if the determined type of the DRX indication signal is the second type and the terminal device keeps synchronization with the network device at this time, the terminal device does not perform the synchronization procedure.

According to exemplary embodiments of the present disclosure, if the determined type of the DRX indication signal is the second type and the terminal device does not keep synchronization with the network device at this time, the terminal device may detect other synchronization signals (for example, PSS and/or SSS) sent from the network device to synchronize with the network device.

According to exemplary embodiments of the present disclosure, according to a sequence length and/or a sequence number corresponding to the type of the DRX indication signal, the terminal device detects the DRX indication signal sent from the network device.

According to exemplary embodiments of the present disclosure, the DRX configuration information includes a length of the DRX cycle.

According to exemplary embodiments of the present disclosure, if the length of the DRX cycle is greater than a first duration, it is determined that the type of the DRX indication signal is a first type that provides a synchronization capability; or if the length of the DRX cycle is smaller than or equal to the first duration, it is determined that the type of the DRX indication signal is a second type that does not provide the synchronization capability.

According to exemplary embodiments of the present disclosure, the first duration is a preset duration on the terminal device.

According to exemplary embodiments of the present disclosure, if the length of the DRX cycle is greater than a second duration notified by the network device, it is determined that the type of the DRX indication signal is a first type that provides a synchronization capability; or if the length of the DRX cycle is smaller than or equal to a second duration notified by the network device, it is determined that the type of the DRX indication signal is a second type that does not provide the synchronization capability; the second duration is determined by the network device based on capability information of the terminal device.

According to exemplary embodiments of the present disclosure, the terminal device determines the type of the DRX indication signal according to the DRX configuration information and capability information of the terminal device.

According to exemplary embodiments of the present disclosure, the capability information of the terminal device includes a duration in which the terminal maintains time-frequency synchronization; and/or, the DRX configuration information includes a length of the DRX cycle.

According to exemplary embodiments of the present disclosure, a second duration is determined according to the duration in which the terminal maintains time-frequency synchronization; if the length of the DRX cycle is greater than the second duration, it is determined that the type of the DRX indication signal is a first type that provides a synchronization capability; or if the length of the DRX cycle is smaller than or equal to the second duration, it is determined that the type of the DRX indication signal is a second type that does not provide the synchronization capability.

According to exemplary embodiments of the present disclosure, the terminal device may notify the network device about the determined second duration, and the network device may determine the type of the DRX indication signal according to the second duration as notified by the terminal device.

According to exemplary embodiments of the present disclosure, if the length of the DRX cycle is greater than the duration in which the terminal maintains time-frequency synchronization, it is determined that the type of the DRX indication signal is a first type that provides a synchronization capability; or if the length of the DRX cycle is smaller than or equal to the duration in which the terminal maintains time-frequency synchronization, it is determined that the type of the DRX indication signal is a second type that does not provide the capability.

According to exemplary embodiments of the present disclosure, the terminal device sends indication information to the network device. The indication information is configured to indicate capability information of the terminal device.

Details regarding the method 300 in FIG. 4 can be found in the above descriptions regarding the method 200, and repeated descriptions are omitted.

For example, details regarding the types of the DRX indication signals can be found in the above descriptions regarding the method 200.

For example, for the manners for the terminal device to determine the type of the DRX indication signal, reference can be made to the above descriptions regarding the method 200 in which the manners for the network device to determine the type of the DRX indication signal are described.

In embodiments of the present disclosure, the network device may determine the type of the DRX indication signal (i.e., the network device may determine whether the DRX indication signal provides the synchronization capability) sent to the terminal device according to different DRX cycle configured for the terminal or the length in which the terminal maintains the time-frequency synchronization. In this way, if the DRX cycle is long, the embodiments of the present disclosure can reduce the power consumption for the terminal device to receive and detect the DRX indication signal, and if the DRX cycle is short, the DRX indication signal that does not provide the synchronization sequence is transmitted to save system overhead.

It should be understood that, in the embodiments of the present disclosure, in addition to determining the type of the DRX indication signal based on the DRX configuration information as shown in FIG. 3 and FIG. 4, the type of the DRX indication signal may also be determined in other manners.

For example, the type of the DRX indication signal can be determined based on the situation in which the terminal device was previously scheduled.

For example, if the time period between the transmission time of the DRX indication signal for the terminal device and the time when the terminal device was last scheduled is longer than a certain time period, it can be determined that the type of the DRX indication signal is a type that provides the synchronization capability; otherwise, it can be determined that the type of the DRX indication signal is a type that does not provide the synchronization capability.

The certain time period may be a preset time period, or may be the duration in which the terminal device maintains time-frequency synchronization, or may be a duration determined based on the duration in which the terminal device maintains the time-frequency synchronization.

In the implementation of the present disclosure, the type of the DRX indication signal may also be determined considering both the situation in which the terminal device was previously scheduled and the DRX configuration information.

Figure 5:
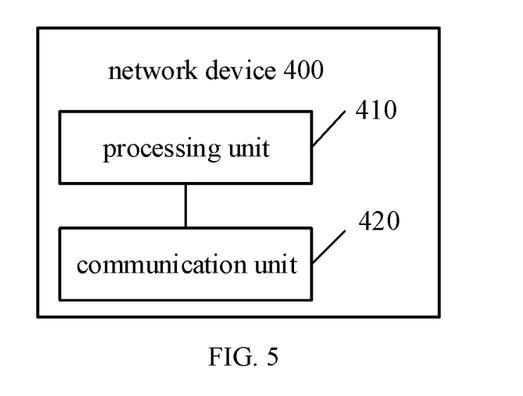
FIG. 5 is a schematic block diagram of a network device according to an embodiment of the present disclosure.

FIG. 5 is a schematic block diagram of a network device 400 according to an embodiment of the present disclosure. As shown in FIG. 5, the network device 400 includes a processing unit 410 and a communication unit 420.

The processing unit 410 is configured to determine a type of a discontinuous transmission (DRX) indication signal according to DRX configuration information. The DRX indication signal is configured to indicate that a terminal device wakes up during an on duration of a DRX cycle.

The communication unit 420 is configured to, according to the type of the DRX indication signal determined by the processing unit, send the DRX indication signal to the terminal device.

According to embodiments of the present disclosure, at least one of a sequence type, a sequence number, and a sequence length for different types of DRX indication signals is different.

According to embodiments of the present disclosure, different types of DRX indication signals provide different synchronization capabilities.

According to embodiments of the present disclosure, the determined type of the DRX indication signal is a first type or a second type;

a DRX indication signal of the first type provides a synchronization capability; and a DRX indication signal of the second type does not provide the synchronization capability.

According to embodiments of the present disclosure, the DRX configuration information includes a length of the DRX cycle.

According to embodiments of the present disclosure, the processing unit 410 is further configured to:

if the length of the DRX cycle is greater than a first duration, determine that the type of the DRX indication signal is a first type that provides a synchronization capability; or if the length of the DRX cycle is smaller than or equal to the first duration, determine that the type of the DRX indication signal is a second type that does not provide the synchronization capability.

According to embodiments of the present disclosure, the first duration is a preset duration on the network device.

According to embodiments of the present disclosure, the processing unit is configured to:

determine the type of the DRX indication signal according to the DRX configuration information and the capability information of the terminal device.

According to embodiments of the present disclosure, the capability information of the terminal device includes a duration in which the terminal maintains time-frequency synchronization; and/or, the DRX configuration information includes a length of the DRX cycle.

According to embodiments of the present disclosure, the processing unit 410 is further configured to:

determine a second duration according to the duration in which the terminal maintains time-frequency synchronization;

if the length of the DRX cycle is greater than the second duration, determine that the type of the DRX indication signal is a first type that provides a synchronization capability; or if the length of the DRX cycle is smaller than or equal to the second duration, determine that the type of the DRX indication signal is a second type that does not provide the synchronization capability.

According to embodiments of the present disclosure, the communication unit 420 is further configured to:

notify the terminal device of the second duration.

According to embodiments of the present disclosure, the processing unit 410 is further configured to:

if the length of the DRX cycle is greater than a duration in which the terminal maintains time-frequency synchronization, determine that the type of the DRX indication signal is a first type that provides a synchronization capability; or if the length of the DRX cycle is smaller than or equal to the duration in which the terminal maintains time-frequency synchronization, determine that the type of the DRX indication signal is a second type that does not provide the capability.

According to embodiments of the present disclosure, the communication unit 420 is further configured to:

receive indication information sent from the terminal device, wherein the indication information is configured to indicate capability information of the terminal device.

According to embodiments of the present disclosure, the communication unit 420 is further configured to:

send the DRX indication signal to the terminal device before the on duration or in a first subframe or a first time slot within the on duration.

It should be understood that the network device 400 corresponds the network device in the method embodiments, and can be configured to perform the operations performed by the network device in the method embodiments, and for brevity, repeated descriptions are omitted here.

Figure 6:
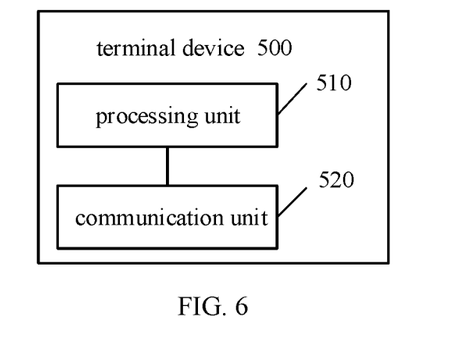
FIG. 6 is a schematic block diagram of a terminal device according to an embodiment of the present disclosure.

FIG. 6 is a schematic block diagram of a terminal device 500 according to an embodiment of the present disclosure. As shown in FIG. 6, the terminal device 500 includes a processing unit 510 and a communication unit 520.

The processing unit 510 is configured to determine a type of a DRX indication signal according to DRX configuration information. The DRX indication signal is configured to indicate that the terminal device wakes up during an on duration of a DRX cycle.

The communication unit 520 is configured to, according to the type of the DRX indication signal, detect the DRX indication signal sent from a network device.

The processing unit 510 is further configured to, in response to the DRX indication signal, enable the terminal device to wake up in the on duration of the DRX cycle.

According to embodiments of the present disclosure, at least one of a sequence type, a sequence number, and a sequence length for different types of DRX indication signals is different.

According to embodiments of the present disclosure, different types of DRX indication signals provide different synchronization capabilities.

According to embodiments of the present disclosure, the determined type of the DRX indication signal is a first type or a second type;

a DRX indication signal of the first type provides a synchronization capability; and a DRX indication signal of the second type does not provide the synchronization capability.

According to embodiments of the present disclosure, if the determined type of the DRX indication signal is the first type, the processing unit 510 is further configured to:

during detection of the DRX indication signal performed by the communication unit, perform a synchronization procedure based on the detected DRX indication signal.

According to embodiments of the present disclosure, the communication unit 520 is further configured to:

according to a sequence length and/or a sequence number corresponding to the type of the DRX indication signal, detect the DRX indication signal sent from the network device.

According to embodiments of the present disclosure, the DRX configuration information includes a length of the DRX cycle.

According to embodiments of the present disclosure, the processing unit 510 is further configured to:

if the length of the DRX cycle is greater than a first duration, determine that the type of the DRX indication signal is a first type that provides a synchronization capability; or if the length of the DRX cycle is smaller than or equal to the first duration, determine that the type of the DRX indication signal is a second type that does not provide the synchronization capability.

According to embodiments of the present disclosure, the first duration is a preset duration on the terminal device.

According to embodiments of the present disclosure, the processing unit 510 is further configured to:

if the length of the DRX cycle is greater than a second duration notified by the network device, determine that the type of the DRX indication signal is a first type that provides a synchronization capability; or if the length of the DRX cycle is smaller than or equal to a second duration notified by the network device, determine that the type of the DRX indication signal is a second type that does not provide the synchronization capability;

wherein the second duration is determined by the network device based on capability information of the terminal device.

According to embodiments of the present disclosure, the processing unit 510 is further configured to:

determine the type of the DRX indication signal according to the DRX configuration information and capability information of the terminal device.

According to embodiments of the present disclosure, the capability information of the terminal device includes a duration in which the terminal maintains time-frequency synchronization; and/or, the DRX configuration information includes a length of the DRX cycle.

According to embodiments of the present disclosure, the processing unit 510 is configured to:

determine a second duration according to the duration in which the terminal maintains time-frequency synchronization;

if the length of the DRX cycle is greater than the second duration, determine that the type of the DRX indication signal is a first type that provides a synchronization capability; or if the length of the DRX cycle is smaller than or equal to the second duration, determine that the type of the DRX indication signal is a second type that does not provide the synchronization capability.

According to embodiments of the present disclosure, the processing unit 510 is further configured to:

if the length of the DRX cycle is greater than the duration in which the terminal maintains time-frequency synchronization, determine that the type of the DRX indication signal is a first type that provides a synchronization capability; or if the length of the DRX cycle is smaller than or equal to the duration in which the terminal maintains time-frequency synchronization, determine that the type of the DRX indication signal is a second type that does not provide the capability.

According to embodiments of the present disclosure, the communication unit 520 is further configured to:

send indication information to the network device, wherein the indication information is configured to indicate capability information of the terminal device.

According to embodiments of the present disclosure, the communication unit 520 is further configured to:

detect the DRX indication signal sent from the network device before the on duration or in a first subframe or a first time slot within the on duration.

It should be understood that the terminal device 500 corresponds the terminal device in the method embodiments, and can be configured to perform the operations performed by the terminal device in the method embodiments, and for brevity, repeated descriptions are omitted here.

Figure 7:
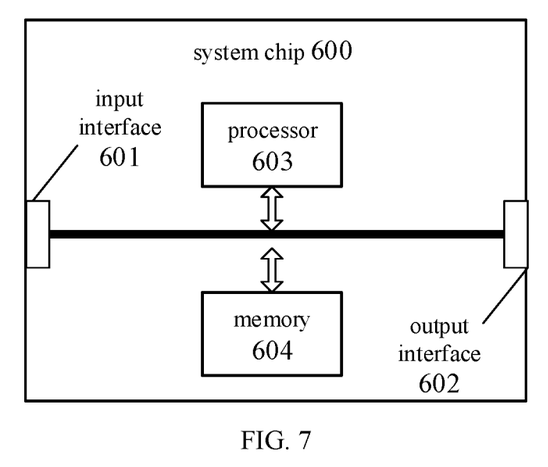
FIG. 7 is a schematic block diagram of a system chip according to an embodiment of the present disclosure.

FIG. 7 is a schematic structural diagram of a system chip 600 according to an embodiment of the present disclosure. The system chip 600 of FIG. 7 includes an input interface 601, an output interface 602, a processor 603, and a memory 604, and the input interface 601, the output interface 602, the processor 603, and the memory 604 can be connected by an internal communication connection line. The processor 603 is configured to execute codes in the memory 804.

According to embodiments of the present disclosure, when the codes are executed, the processor 603 implements the methods performed by the network device in the method embodiments. For the sake of brevity, repeated descriptions are omitted here.

According to embodiments of the present disclosure, when the codes are executed, the processor 603 implements the methods performed by the terminal device in the method embodiments. For the sake of brevity, repeated descriptions are omitted here.

Figure 8:
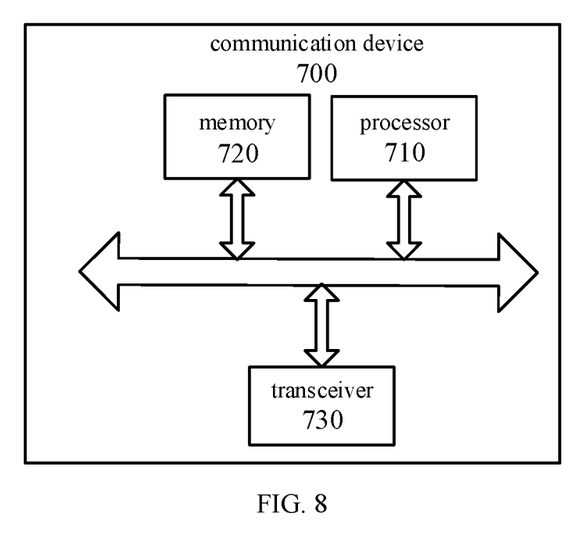
FIG. 8 is a schematic block diagram of a communication device according to an embodiment of the present disclosure.

FIG. 8 is a schematic block diagram of a communication device 700 according to an embodiment of the present disclosure. As shown in FIG. 8, the communication device 700 includes a processor 710 and a memory 720. The memory 720 can store program codes, and the processor 710 can execute the program codes stored in the memory 720.

According to embodiments of the present disclosure, as shown in FIG. 8, the communication device 700 can include a transceiver 730, and the processor 710 can control the transceiver 730 to communicate with outside devices.

According to embodiments of the present disclosure, the processor 710 can call the program codes stored in the memory 720 to perform the corresponding operations performed by the network device in the method embodiments. For brevity, details are not described herein again.

According to embodiments of the present disclosure, the processor 710 can call the program codes stored in the memory 720 to perform the corresponding operations performed by the terminal device in the method embodiments. For brevity, details are not described herein again.

It should be understood that the processors in the embodiments of the present disclosure may be an integrated circuit chip which has signal processing capability. During implementation, each step of the foregoing method embodiments can be completed by an integrated hardware logic circuit in the processors or software instructions. Each of the above-described processors can be a general-purpose processor, a Digital Signal Processors (DSPs), an Application Specific Integrated Circuit (ASIC), a Field Programmable Gate Array (FPGA) or other programmable logic devices, discrete gates or transistor logic devices, discrete hardware components, which can implement or perform the methods, steps, and logical block diagrams disclosed in the embodiments of the present disclosure. The general-purpose processor can be a microprocessor or any conventional processor. The steps of the methods disclosed in the embodiments of the present disclosure can be directly completed by a hardware decoding processor, or by a combination of hardware and software modules in the decoding processor. The software modules can be located in a storage medium that is well-known in the art such as a random access memory, a flash memory, a read only memory, a programmable read only memory or an electrically erasable programmable memory, a register. The storage medium is located in the memory and the processor reads information in the memory and completes the steps of the above-described methods with its hardware.

It can be understood that the memory in the embodiments of the present disclosure can be a volatile memory or a non-volatile memory, or can include both volatile memory and non-volatile memory. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM) that serves as an external cache. By exemplary rather than limiting way, many forms of RAMs can be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories in the systems and methods described herein are intended to include, but not limited to, these and any other suitable types of memories.

It should be understood that the terms "system" and "network" are used interchangeably herein. The term "and/or" herein is merely an association describing the associated objects, indicating that there may be three relationships. For example, A and/or B may indicate that A exists only, and both A and B exist, and B exists only. Further, the character "/" generally indicates that the contextual objects are in an "or" relationship.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A communication method, comprising:
   determining, by a terminal device, a type of a discontinuous transmission (DRX) indication signal according to DRX configuration information, wherein the DRX indication signal is configured to indicate that the terminal device wakes up during an on duration of a DRX cycle;
   according to the type of the DRX indication signal, detecting by the terminal device the DRX indication signal sent from a network device; and
   in response to the DRX indication signal, enabling the terminal device to wake up in the on duration of the DRX cycle.

2. The method according to claim 1, wherein at least one of a sequence type, a sequence number, and a sequence length for different types of DRX indication signals is different; and
   wherein different types of DRX indication signals provide different synchronization capabilities.

3. The method according to claim 1, wherein:
   the determined type of the DRX indication signal is a first type or a second type;
   a DRX indication signal of the first type provides a synchronization capability; and
   a DRX indication signal of the second type does not provide the synchronization capability.

4. The method according to claim 3, wherein if the determined type of the DRX indication signal is the first type, the method further comprises:
   during detection of the DRX indication signal, performing a synchronization procedure by the terminal device based on the detected DRX indication signal.

5. The method according to claim 1, wherein detecting by the terminal device the DRX indication signal sent from a network device according to the type of the DRX indication signal, comprises:
   according to a sequence length and/or a sequence number corresponding to the type of the DRX indication signal, detecting by the terminal device the DRX indication signal sent from the network device.

6. The method according to claim 1, wherein the DRX configuration information comprises a length of the DRX cycle.

7. The method according to claim 6, wherein determining, by a terminal device, a type of a DRX indication signal according to DRX configuration information, comprises:
   if the length of the DRX cycle is greater than a first duration, determining that the type of the DRX indication signal is a first type that provides a synchronization capability; or
   if the length of the DRX cycle is smaller than or equal to the first duration, determining that the type of the DRX indication signal is a second type that does not provide the synchronization capability.

8. The method according to claim 6, wherein determining, by a terminal device, a type of a DRX indication signal according to DRX configuration information, comprises one of the following:
   if the length of the DRX cycle is greater than a second duration notified by the network device, determining that the type of the DRX indication signal is a first type that provides a synchronization capability; and
   if the length of the DRX cycle is smaller than or equal to a second duration notified by the network device, determining that the type of the DRX indication signal is a second type that does not provide the synchronization capability;
   wherein the second duration is determined by the network device based on capability information of the terminal device.

9. The method according to claim 8, further comprising:
   sending, by the terminal device, indication information to the network device, wherein the indication information is configured to indicate capability information of the terminal device.

10. The method according to claim 1, wherein determining, by a terminal device, a type of a DRX indication signal according to DRX configuration information, comprises:
    determining, by the terminal device, the type of the DRX indication signal according to the DRX configuration information and capability information of the terminal device.

11. The method according to claim 10, wherein one of the following is performed:
    the capability information of the terminal device comprises a duration in which the terminal maintains time-frequency synchronization; and
    the DRX configuration information comprises a length of the DRX cycle,
    wherein determining, by the terminal device, the type of the DRX indication signal according to the DRX configuration information and capability information of the terminal device, comprises:

determining a second duration according to the duration in which the terminal maintains time-frequency synchronization;
if the length of the DRX cycle is greater than the second duration, determining that the type of the DRX indication signal is a first type that provides a synchronization capability; or
if the length of the DRX cycle is smaller than or equal to the second duration, determining that the type of the DRX indication signal is a second type that does not provide the synchronization capability.

12. The method according to claim 11, wherein determining, by the terminal device, the type of the DRX indication signal according to the DRX configuration information and capability information of the terminal device, comprises one of the following:
if the length of the DRX cycle is greater than the duration in which the terminal maintains time-frequency synchronization, determining that the type of the DRX indication signal is a first type that provides a synchronization capability; and
if the length of the DRX cycle is smaller than or equal to the duration in which the terminal maintains time-frequency synchronization, determining that the type of the DRX indication signal is a second type that does not provide the capability.

13. The method according to claim 1, wherein detecting by the terminal device the DRX indication signal sent from a network device, comprises:
detecting, by the terminal device, the DRX indication signal sent from the network device before the on duration or in a first subframe or a first time slot within the on duration.

14. A terminal device, comprising:
a processor;
a memory storing instructions executable by the processor; and
a transceiver;
wherein the processor is configured to:
determine a type of a discontinuous transmission (DRX) indication signal according to DRX configuration information, wherein the DRX indication signal is configured to indicate that the terminal device wakes up during an on duration of a DRX cycle;
the transceiver is configured to, according to the type of the DRX indication signal, detect the DRX indication signal sent from a network device;
wherein the processing unit is further configured to, in response to the DRX indication signal, enable the terminal device to wake up in the on duration of the DRX cycle.

15. The terminal device according to claim 14, wherein at least one of a sequence type, a sequence number, and a sequence length for different types of DRX indication signals is different; and
wherein different types of DRX indication signals provide different synchronization capabilities.

16. The terminal device according to claim 14, wherein:
the determined type of the DRX indication signal is a first type or a second type;
a DRX indication signal of the first type provides a synchronization capability; and
a DRX indication signal of the second type does not provide the synchronization capability.

17. The terminal device according to claim 16, wherein if the determined type of the DRX indication signal is the first type, the processor is further configured to:
during detection of the DRX indication signal performed by the communication unit, perform a synchronization procedure based on the detected DRX indication signal.

18. The terminal device according to claim 14, wherein the transceiver is further configured to:
according to a sequence length and/or a sequence number corresponding to the type of the DRX indication signal, detect the DRX indication signal sent from the network device.

19. The terminal device according to claim 14, wherein the DRX configuration information comprises a length of the DRX cycle.

20. The terminal device according to claim 19, wherein the processor is further configured to perform one of the following:
if the length of the DRX cycle is greater than a first duration, determine that the type of the DRX indication signal is a first type that provides a synchronization capability; and
if the length of the DRX cycle is smaller than or equal to the first duration, determine that the type of the DRX indication signal is a second type that does not provide the synchronization capability.

* * * * *